United States Patent [19]
Flockhart et al.

[11] Patent Number: 6,064,731
[45] Date of Patent: May 16, 2000

[54] ARRANGEMENT FOR IMPROVING RETENTION OF CALL CENTER'S CUSTOMERS

[75] Inventors: Andrew D. Flockhart, Thornton, Colo.;
Robin H. Foster, Little Silver, N.J.;
Eugene P. Mathews, Barrington, Ill.

[73] Assignee: Lucent Technologies Inc., Murray Hill, N.J.

[21] Appl. No.: 09/182,353

[22] Filed: Oct. 29, 1998

[51] Int. Cl.[7] .................................................. H04M 3/00
[52] U.S. Cl. .......................................... 379/265; 379/266
[58] Field of Search .................................. 379/266, 265, 379/309, 207, 221

[56] References Cited

U.S. PATENT DOCUMENTS

| | | | |
|---|---|---|---|
| 5,594,791 | 1/1997 | Szlam et al. | 379/266 |
| 5,684,872 | 11/1997 | Flockhart et al. | 379/266 |
| 5,905,793 | 5/1999 | Flockhart et al. | 379/266 |
| 5,970,134 | 10/1999 | Highland et al. | 379/265 |

*Primary Examiner*—Creighton Smith
*Attorney, Agent, or Firm*—David Volejnicek

[57] ABSTRACT

In a call center (100) of a business, if it is determined (314–318 or 320) during the handling of a call involving a party who is a customer of the business that the party is at risk of being lost as a customer to the business, an identifier of the party, such as ANI, is captured (300) and stored (322) along with an "at risk" indication. The determination may be made either automatically by detecting (314–318) that the party terminated the call while on hold, or manually (320) by the agent handling the call or a service observer whereupon the agent or observer pressed an "at risk" feature button (112) on their terminal (105, 110). On a subsequent call to or from that party, the stored identifiers (380) are searched (306), and when it is determined (308) that the party is identified therein as being at risk, the call is given (310) special treatment (400–426)—a higher-than-normal level of service—and is identified (428) to the call's handler as involving an "at risk" customer, in an attempt to avoid loss of the party as a customer.

13 Claims, 3 Drawing Sheets

ARRANGEMENT FOR IMPROVING RETENTION OF CALL CENTER'S CUSTOMERS

TECHNICAL FIELD

This invention relates to call centers, also commonly referred to as automatic call distribution systems and telemarketing systems.

BACKGROUND OF THE INVENTION

Studies have shown that it is much more cost effective for a company to retain an existing customer than it is to try to win a new customer. They have also shown that the most common reason for a customer to switch suppliers is because of poor service and not because of any complaint about the product being purchased. Providing good customer service and preserving the loyalty of existing customers is therefore one of the primary objectives of today's businesses. Consequently, the ability to identify "at risk" customers who have received poor service or are otherwise dissatisfied, and to take steps to correct the problem before the customer is lost, is of prime importance to a business.

Large businesses generally provide a significant amount of their customer service telephonically via call centers. Their approaches to maintaining customer satisfaction with customer service focus on agent training and service observing in an attempt to maintain high standards of service. But even if they meet their objectives, it is inevitable that there will be at least some instances of customer service that, for one reason or another, leave a customer dissatisfied. A solution for the problem of identifying and retaining such "at risk" customers is therefore needed.

SUMMARY OF THE INVENTION

This invention is directed to solving the problems and meeting the needs of the prior art. Illustratively according to the invention, the solution is to capture identifiers (e.g., the calling number, ANI) of calling or called parties who are deemed to be "at risk", and to provide special call treatment for these parties when they contact the company again (or when the company contacts them). The intent is to offer a higher-than-normal level of service to these parties in an attempt to avoid the loss of their business. (The term "call" is used broadly herein to encompass any communication.)

For an automated implementation, one of the clearest signs that a party has received poor service and is probably highly frustrated is that the party abandons after being answered by an agent. The most common cause is because the agent has placed the call on hold and failed to return to the call in an acceptable period of time. This is one event that can be programmed to identify an "at risk" customer.

For manual implementation, agents and service observers can be given new feature buttons or other actuators which can be used while a call is active to identify and automatically log the ANI of any party whose business is deemed to be "at risk".

Generally according to the invention, a method of handling communications, e.g., at a call center, involves the following: While handling a first communication involving a party thereto, determining that the party is (actually or potentially) dissatisfied with the handling. In response, storing an indication of the party's dissatisfaction. Then, in response to a second communication involving that party, determining from the stored indication that this party was dissatisfied, and therefore providing special handling of the second communication to alleviate the party's dissatisfaction. The party is also preferably identified to a handler of the second communication as a dissatisfied party. Illustratively, the special handling involves at least one of (a) having a handler other than a handler of the first communication handle the second communication, (b) having the second communication handled by a specialist, (c) having the second communication handled by a supervisor of communication handlers, (d) avoiding handling the second communication by a non-human handler (e.g., an interactive voice response unit), (e) handling the second communication as a high-priority communication, and (f) handling the second communication immediately and out of turn with other communications that are waiting to be handled.

While characterized above as a method, the invention also encompasses an apparatus that performs the method, and a processor-readable medium containing software which, when executed in a processor, causes the processor to perform the method. The apparatus preferably includes an effector—any entity that effects the corresponding step, unlike a means—for each method step.

These and other features and advantages of the present invention will become clearer from the following description of an illustrative embodiment of the invention considered together with the drawing.

DETAILED DESCRIPTION

Figure 1:
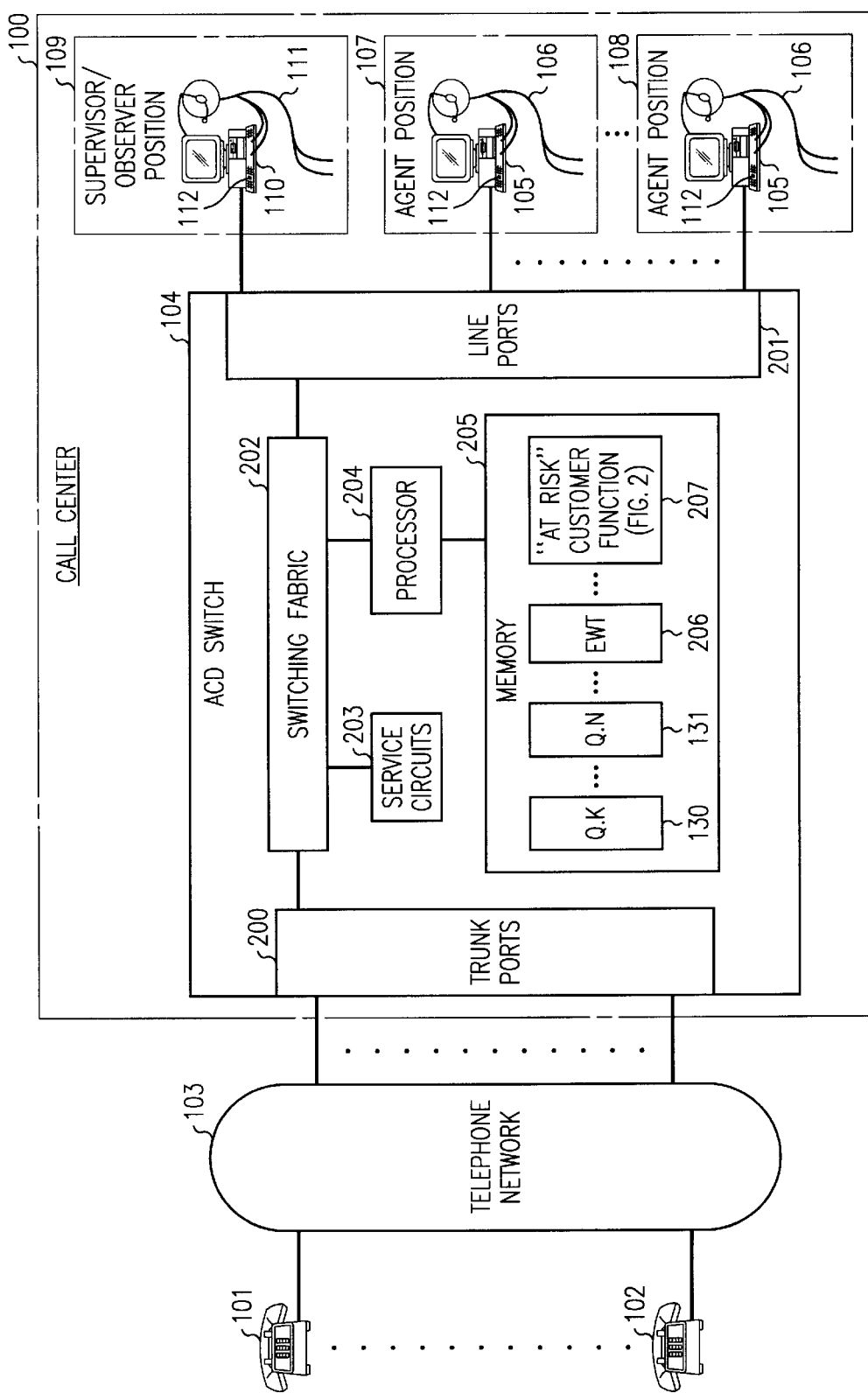
FIG. 1 is a block diagram of a call center that includes an illustrative embodiment of the invention.

FIG. 1 shows a call center 100 that is interconnected with telephones 101–102 of callers who are potential users of call center 100 by a telephone network 103. Call center 100 comprises an automatic call distribution (ACD) switch 104, a plurality of agent positions 107–108, and a supervisor and/or service observer position 109. Each agent position 107–108 comprises a call-handling terminal 105, such as a display telephone or a voice-enabled data terminal, and is staffed by a call-handling agent 106. Supervisor/observer position 109 comprises a supervisor's/observer's terminal 110 that has abilities beyond call handling, such as call monitoring of calls being handled by agents 106, etc., and is staffed by a supervisor/observer 111. ACD switch 104 conventionally includes trunk ports 200 for connecting ACD switch 104 to telephone network 103; line ports 201 for connecting ACD switch 104 to agent positions 107–108 and supervisor position 109; service circuits 203 that provide various services, such as tone generators, announcement generators, hold circuits, conference circuits, modems, interactive voice-response units, etc.; a switching fabric 202 that selectively interconnects ports 200, ports 201, and service circuits 203; a processor 204 that controls switching fabric 202 and other elements of ACD switch 104; and a memory 205 which holds control programs and data which processor 204 executes and uses to control then operation of ACD switch 104. Memory 205 includes queues 130–131 for calls that cannot be handled immediately, and an estimated waiting time (EWT) function 206 which computes the amount of time that a call is likely to spend in any one of the queues 130–131 before being taken out of the queue, e.g., before being connected to an agent position 107–108. ACD switch 104 is illustratively the Lucent Technologies Definity® ACD private branch exchange (PBX). As described so far, call center 100 is conventional.

Figure 2:
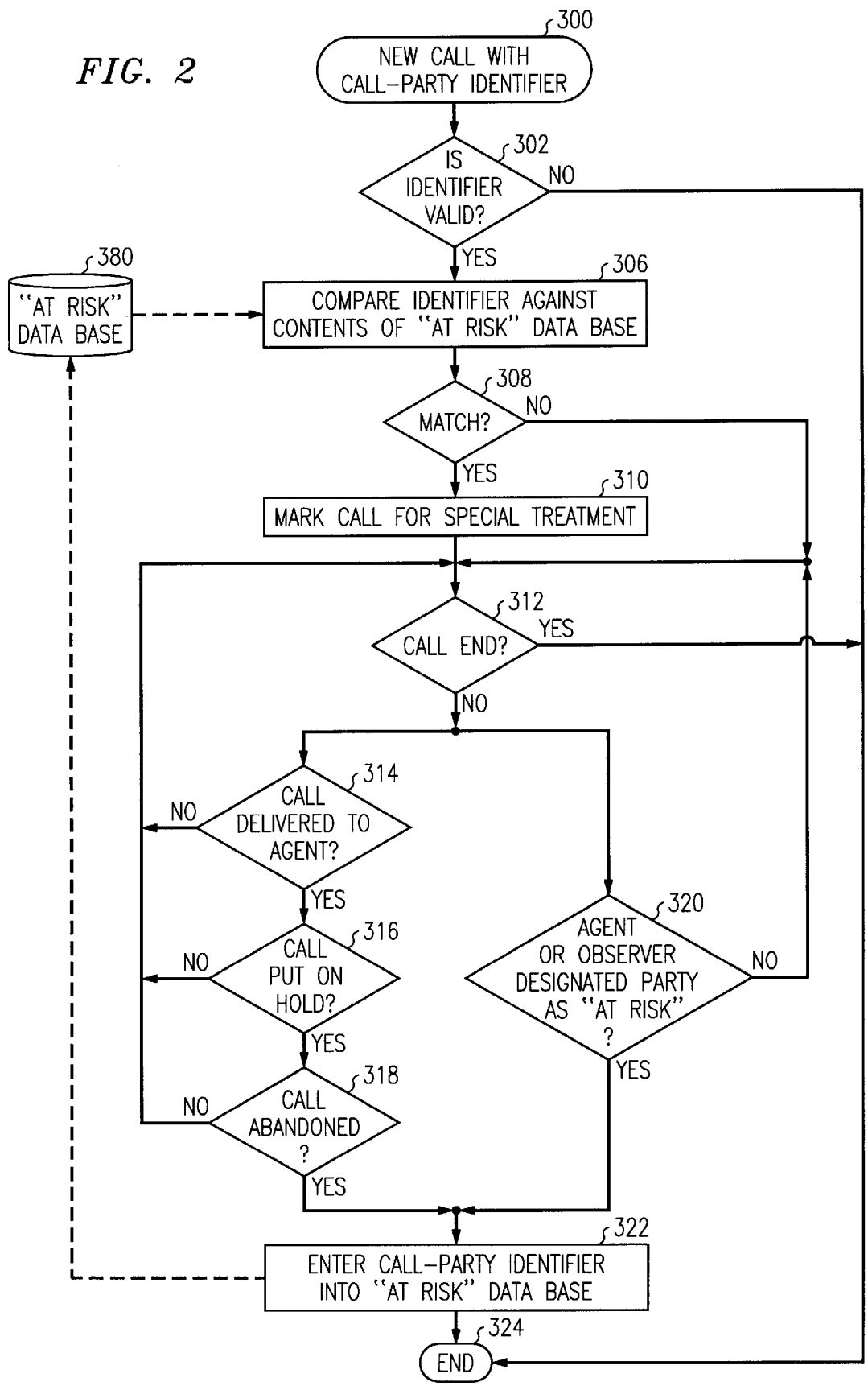
FIG. 2 is a flow diagram of operations of an "at risk" customer function of an ACD switch of the call center of FIG. 1.

According to the invention, memory 205 includes an "at risk" customer function 207 for execution by processor 204. Operations performed by function 207 are shown in the flowchart of FIG. 2. Execution of function 207 by processor 204 is invoked either in response to arrival at ACD switch 104 of a new call for which the calling number, account number, or some other caller identifier, has been obtained (e.g., via automated number identification (ANI), a voice response unit (VRU), or some other mechanism) by ACD switch 104, or in response to the placing of a call by ACD switch 104 to a known number, at step 300. Processor 204 evaluates the obtained identifier to determine if it is valid, at step 302. For example, in the case of ANI of a newly-arrived call, processor 204 checks the "ii" digits that accompany the calling number to determine if the call is from a paystation, a hotel room, or a roaming cellular radiotelephone; if so, the identifier is deemed to be invalid (because it cannot be determined who the caller is from such a calling number). In the case of an account number or a personal identification number (PIN), processor 204 checks a database (not shown) of valid account numbers and PINs to determine if the obtained identifier appears therein. If the case of an outbound call to a known number, the identifier (the called number) is valid a-priori.

If the identifier is determined to be invalid, the call will be processed conventionally, and so execution of function 207 ends with respect to this call, at step 324. If the obtained identifier is determined to be valid, processor 204 compares the obtained identifier against contents of an "at risk" database 380 which contains identifiers of customers who are deemed to be at risk, at step 306, to determine if the calling or called party to the call is designated therein as an "at risk" customer, at step 308. If so, the call is marked for special treatment, at step 310; if not, the call will be processed conventionally. Special treatment of an "at risk" customers call may constitute any desired treatment. For example, the call may be given a high priority, so that it does not have to wait in a call queue 130–131 as long as other calls, or may even bypass queues 130–131 altogether and be assigned to an agent 106 immediately and out of turn with other calls that are waiting to be handled. Also, the call may be marked for handling by one of the call center's best-qualified agents 106, or even by supervisor 111. Also, an indication (e.g., a displayed message) is given to agent 106 or supervisor 111 to whom the call is assigned for handling, that this is a call involving an "at risk" customer so that the call handler can make an extra effort to satisfy this customer.

Figure 3:
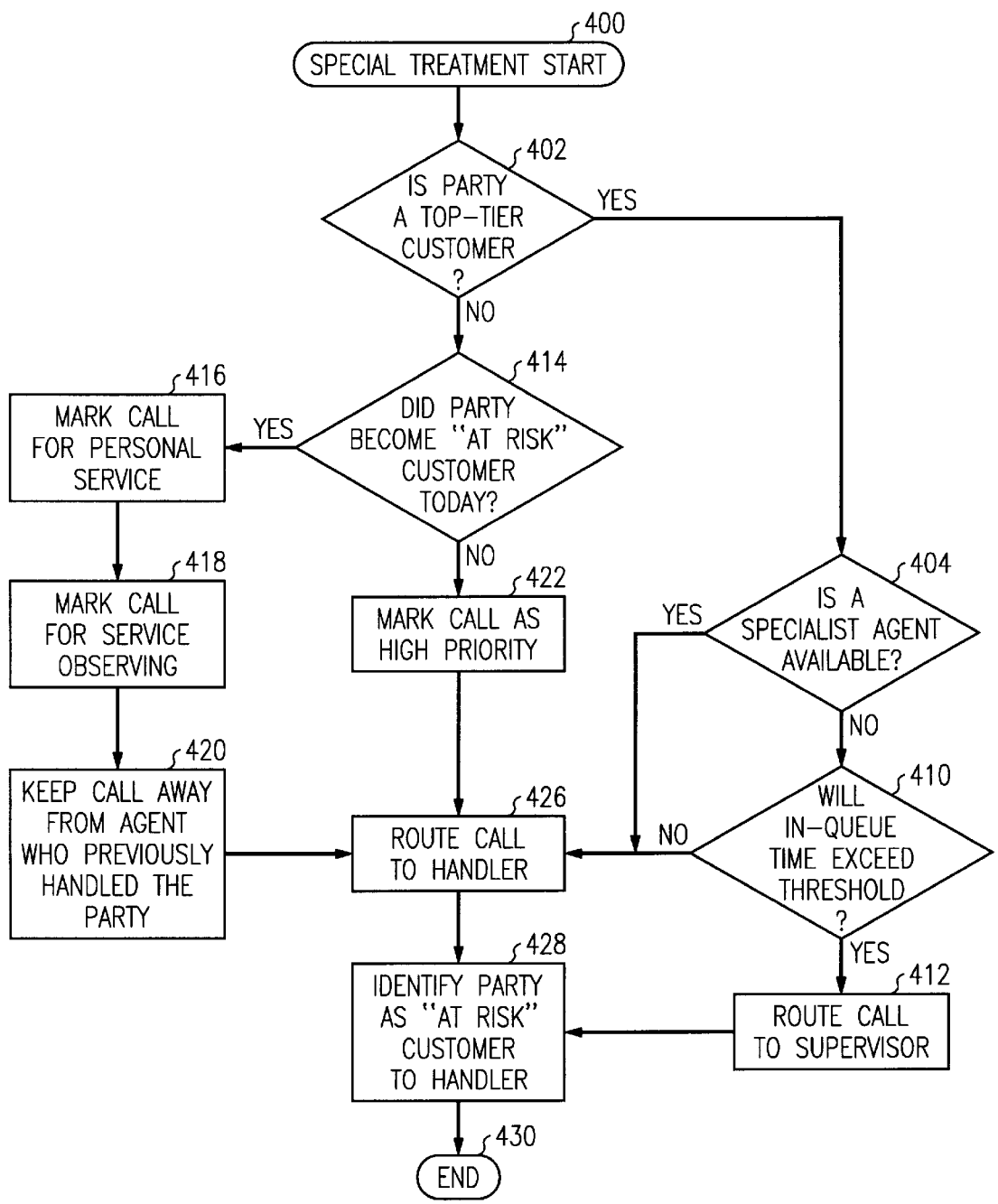
FIG. 3 is a flow diagram of operations of a special treatment function of the ACD switch of the call center of FIG. 1.

An example of special treatment that may be implemented by ACD switch 104 is flowcharted in FIG. 3. First, a determination is made, from customer records kept by call center 100, whether this calling or called party to the call is a top-tier (preferred) customer, at step 402. If so, a determination is made of whether an agent 106 who is a specialist is available to handle the call, at step 404. If so, the call is routed to the specialist for handling, at step 426, and the party is identified (e.g., via a message displayed on the handling agent's terminal) to the handler an "at risk" customer, at step 428. Returning to step 404, it if is determined that a specialist is not available, EWT function 206 is used to determine whether the in-queue wait time will exceed a threshold (e.g., 10 seconds), at step 410. If not, the call remains in a queue 130–131 to eventually be routed to an available agent 106 for handling, at steps 426 et seq. If the in-queue wait time will exceed the threshold, the call is routed to supervisor 111 for handling, at step 412, and the party is identified to supervisor 111 as an "at risk" customer, at step 428.

Returning to step 402, if the party is not a top-tier customer, call records and/or database 380 are checked to determine if the party became an "at risk" customer today, at step 414. If so, the call is marked for personal service (e.g., no use of call prompting or interactive voice response, etc.), at step 416, for service observing by a supervisor/observer 111, at step 418, and for handling by an agent 106 other than the one who handled the party's previous call, at step 420. The call then remains in queue to eventually be routed to an available agent 106 for handling, at steps 426 et seq. Returning to step 414, if the party did not become an "at risk" customer today, the call is marked as a high-priority call so that it will receive priority treatment over other calls, at step 422, and is eventually routed to an available agent 106 for handling, at steps 426 et seq. Following step 428, the special treatment ends, at step 430.

Returning to FIG. 2, following step 308 or 310, processor 204 continues to monitor the call until it ends, as determined at step 312, whereupon execution of function 207 ends for this call, at step 324. While the call is being monitored, if it is delivered to an agent 106 for handling, as determined at step 314, is subsequently put on hold, as determined at step 316, and is abandoned (i.e. the party hangs up) while it is on hold, at step 318, the customer is considered to be "at risk", and so processor 204 enters the obtained identifier of the party in "at risk" database 380, at step 322. Optionally, a callback call to the customer may be made at this time from ACD switch 104 so that the agent 106 who handled the call or the supervisor 111 may apologize to the party and complete the interrupted transaction with the party. Additionally if the agent 106 who is handling the call or a supervisor/observer 111 decides for some reason during the handling of the call that this customer is "at risk") and manually actuates an "at risk" actuator on their terminal 105 or 110 (e.g., by pushing an "at risk" button 112 or typing a corresponding entry), at step 320, processor 204 enters the identifier of the party in "at risk" database 380, at step 322. An agent may perceive a customer to be "risk" if, for example, the customer expresses anger, dissatisfaction, frustration, or a complaint about the company or its service or product. Following step 322, execution of function 207 ends for this call, at step 324.

Of course, various changes and modifications to the illustrative embodiment described above may be envisioned. For example, the system can mark a customer as being "at risk" if, while in queue, the customer abandons the call after an exceptionally long wait. Also, a customer may be manually marked in the database as being "at risk" if some form of communication expressing a complaint or other dissatisfaction was received from the customer. Such changes and modifications can be made without departing from the spirit and the scope of the invention and without diminishing its attendant advantages. It is therefore intended that such changes and modifications be covered by the following claims.

What is claimed is:

1. A method of handling communications comprising:

while handling a first communication involving a party to the first communication, determining that the party is dissatisfied with the handling;

in response, storing an indication of the party's dissatisfaction;

in response to a second communication involving the party, determining from the stored indication that this patty was dissatisfied; and in response, providing special handling of the second communication to alleviate the party's dissatisfaction.

2. The method of claim 1 wherein:

the first and the second communication are each a communication between a business and the party who is a customer of the business; and storing an indication comprises storing an indication that the party is at risk of being lost as a customer to the business.

3. The method of claim 1 wherein:

determining that the party is dissatisfied comprises detecting actuation of an actuator, whose actuation indicates the dissatisfaction, by one of a handler of the first communication and a service observer of handling of the first communication.

4. The method of claim 1 wherein:

determining that the party is dissatisfied comprises detecting termination of the first communication while the first communication is on hold.

5. The method of claim 4 wherein:

detecting termination comprises detecting that handling of the first communication has commenced and that the first communication has been put on hold by a handler of the first communication; and detecting that the first communication was terminated by the party while the first communication is on hold.

6. The method of claim 1 wherein:

determining from the stored indication that this party was dissatisfied comprises one of (a) receiving the second communication from the party and (b) placing the second communication to the party; and in response, checking stored indications for presence of the stored indication that this party was dissatisfied.

7. The method of claim 1 wherein:

storing comprises capturing an identifier of the party; and storing the identifier as the indication.

8. The method of claim 1 wherein:

providing special handling comprises at least one of (a) having a handler other than a handler of the first communication handle the second communication, (b) having the second communication handled by a specialist, (c) having the second communication handled by a supervisor of communication handlers, (d) avoiding handling the second communication by a non-human handler of communications, (e) handling the second communication as a high-priority communication, and (f) handling the second communication immediately and out of turn with other communications that are waiting to be handled.

9. The method of claim 1 wherein:

providing special handling comprises identifying the party as dissatisfied to a handler of the second communication.

10. A method of handling calls at a call center of a business, comprising:

while handling a first call involving a party who is a customer of the business, detecting one of (a) actuation of an actuator whose actuation indicates that the party is at risk of being lost as a customer to the business, by an agent who is handling the first call or by a service observer who is observing the handling of the first call, and (b) termination of the first call after it has been put on hold by the agent and while it is on hold;

capturing an identifier of the party;

in response to the detection, storing the identifier as an indication that the party is at risk of being lost as a customer to the business;

one of (c) receiving a second call from the party and (d) placing a second call to the party;

in response, checking stored indications for presence of the stored indication that the party is at risk of being lost as a customer to the business;

in response to presence of the stored Indication, providing special handling of the second call comprising at least one of (e) having an agent other than the agent who handled the first call handle the second call, (f) having the second call handled by a specialist, (g) having the second call handled by a supervisor of the agents, (h) avoiding handling the second call by a non-human handler of calls, (i) handling the second call as a high-priority call, and (j) handling the second call immediately and out of turn with other calls that are waiting to be handled; and identifying the party to the handler of the second call as being a party at risk of being lost as a customer to the business.

11. An apparatus that performs the method of claim 1 or 2 or 3 or 4 or 5 or 6 or 7 or 8 or 9 or 10.

12. The apparatus of claim 10 comprising an automated call distribution system.

13. A processor-readable medium containing software which, when executed in a processor, causes the processor to perform the method of claim 1 or 2 or 3 or 4 or 5 or 6 or 7 or 8 or 9 or 10.

* * * * *